US012124464B2

(12) United States Patent
Martino et al.

(10) Patent No.: US 12,124,464 B2
(45) Date of Patent: *Oct. 22, 2024

(54) OBJECT-CENTRIC DATA ANALYSIS SYSTEM AND GRAPHICAL USER INTERFACE

(71) Applicant: Palantir Technologies Inc., Denver, CO (US)

(72) Inventors: Alexander Martino, New York, NY (US); Charles Perinet, London (GB); Matthieu Beteille, London (GB)

(73) Assignee: Palantir Technologies Inc., Denver, CO (US)

( * ) Notice: Subject to any disclaimer, the term of this patent is extended or adjusted under 35 U.S.C. 154(b) by 314 days.

This patent is subject to a terminal disclaimer.

(21) Appl. No.: 17/588,084

(22) Filed: Jan. 28, 2022

(65) Prior Publication Data

US 2022/0147519 A1    May 12, 2022

Related U.S. Application Data

(63) Continuation of application No. 16/716,317, filed on Dec. 16, 2019, now Pat. No. 11,269,907.
(Continued)

(51) Int. Cl.
*G06F 17/00* (2019.01)
*G06F 3/0482* (2013.01)
(Continued)

(52) U.S. Cl.
CPC .......... *G06F 16/248* (2019.01); *G06F 3/0482* (2013.01); *G06F 9/451* (2018.02); *G06F 16/26* (2019.01)

(58) Field of Classification Search
CPC ........ G06F 16/248; G06F 16/26; G06F 9/451; G06F 3/0482
See application file for complete search history.

(56) References Cited

U.S. PATENT DOCUMENTS 9,646,396 B2 * 5/2017 Sharma ............... G06F 16/9027
9,922,108 B1 * 3/2018 Meiklejohn .......... G06F 16/289
(Continued)

FOREIGN PATENT DOCUMENTS

EP    3038002    6/2016
EP    3822810    5/2021

OTHER PUBLICATIONS

Official Communication for European Patent Application No. 20207467.0 dated May 29, 2024, 7 pages.
(Continued)

*Primary Examiner* — Laurie A Ries
(74) *Attorney, Agent, or Firm* — Knobbe, Martens, Olson & Bear, LLP

(57) ABSTRACT

Systems and methods for analyzing data stored using a data model. The system can receive a user selection of a first object type indicating to perform filtering operations on a first set of data objects, generate a list of object types linked to the first object type based on an ontology, receives a user selection of a second object type, generate a list of properties of the second object type based on an ontology, receive a user selection of a first property from the list of properties, perform a data query determining values associated with the first property, receive a user selection of a first value, and displays information of a subset of data objects being a portion of the first set of data objects that are linked to data objects in the second set of data objects that have a first property value of the first value.

20 Claims, 10 Drawing Sheets

Related U.S. Application Data

(60) Provisional application No. 62/936,178, filed on Nov. 15, 2019.

(51) Int. Cl.
*G06F 9/451* (2018.01)
*G06F 16/248* (2019.01)
*G06F 16/26* (2019.01)

(56) References Cited

U.S. PATENT DOCUMENTS

| | | | | |
|---|---|---|---|---|
| 10,444,940 | B2* | 10/2019 | Cervelli | G06T 11/206 |
| 10,877,984 | B1* | 12/2020 | Martino | G06F 16/248 |
| 11,269,907 | B1 | 3/2022 | Martino et al. | |
| 11,580,164 | B1* | 2/2023 | Falco | G06F 16/338 |
| 2002/0124115 | A1* | 9/2002 | McLean | H04L 12/2805 |
| | | | | 719/310 |
| 2008/0172628 | A1* | 7/2008 | Mehrotra | G06F 16/9024 |
| | | | | 707/999.103 |
| 2011/0175932 | A1* | 7/2011 | Yu | G06F 3/04845 |
| | | | | 345/661 |
| 2014/0155124 | A1* | 6/2014 | Lee | G06F 3/04855 |
| | | | | 455/566 |
| 2015/0205848 | A1* | 7/2015 | Kumar | G06F 16/904 |
| | | | | 707/754 |
| 2016/0321064 | A1* | 11/2016 | Sankaranarasimhan | |
| | | | | H04L 67/34 |
| 2016/0350381 | A1 | 12/2016 | Cao et al. | |
| 2017/0115865 | A1* | 4/2017 | Goldenberg | G06F 3/04812 |
| 2017/0185674 | A1* | 6/2017 | Tonkin | G06F 16/328 |
| 2017/0277738 | A1* | 9/2017 | Danka | G06F 16/26 |
| 2018/0096417 | A1* | 4/2018 | Cook | G06N 5/01 |
| 2018/0210725 | A1* | 7/2018 | Vaindiner | G06F 8/65 |
| 2019/0026260 | A1* | 1/2019 | Schubert | G06F 40/174 |
| 2019/0392032 | A1* | 12/2019 | Yasui | G06F 40/18 |
| 2020/0019550 | A1* | 1/2020 | Keenan | G06F 16/289 |
| 2021/0117051 | A1* | 4/2021 | McRaven | G06T 11/206 |
| 2021/0141521 | A1* | 5/2021 | Apostolatos | G06T 11/206 |
| 2022/0374140 | A1* | 11/2022 | Ma | G06F 3/0481 |
| 2023/0075655 | A1* | 3/2023 | Piecko | G06F 16/2452 |

OTHER PUBLICATIONS

Card et al., "Degree-of-Interest Trees: A Component of an Attention-Reactive User Interface", AVI2002, Advanced Visual Interface, Jan. 2002, pp. 231-245.

Van Harmelen et al., "Ontology-Based Information Visualisation", Oct. 16, 2001, 9 pages.

Official Communication for European Patent Application No. 20207467.0 dated Apr. 6, 2021, 10 pages.

* cited by examiner

OBJECT-CENTRIC DATA ANALYSIS SYSTEM AND GRAPHICAL USER INTERFACE

REFERENCE TO PRIORITY APPLICATIONS

This application is a continuation of U.S. application Ser. No. 16/716,317, filed Dec. 16, 2019, which claims the benefit of U.S. Provisional Application No. 62/936,178 filed on Nov. 15, 2019, and titled "OBJECT-CENTRIC DATA ANALYSIS SYSTEM AND GRAPHICAL USER INTERFACE." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data analysis and visualization. More specifically, this disclosure relates to ontology-based and content-based queries for analyzing and displaying data configurable charts and visualizations.

BACKGROUND

An ontology includes stored information that provides a data model for storage and association of data in one or more databases. The stored data may comprise definitions for data object types and respective associated property types. Analysis of a large data set stored using an ontology can start with selecting a portion of data stored as a data object and drilling-down into the data set to gain insight into a desired portion of the data set. In some instances, inexperienced and/or non-technical users may want to explore a data set or perform ad hoc analysis but the users may not have the requisite understanding of underlying tables, complicated object associations, and/or how to write code to join tables, filter data, etc. that they need to perform their desired analysis. Such situations can lead to inefficiencies in the analysis due to performing needless data queries, or not being able to perform the analysis at all. The analysis of certain data sets may benefit from displaying visualizations of the objects and down-selecting or filtering objects from a dashboard having multiple visualizations of the data. However, there is no system to adequately provide a graphical object-oriented methodology using associated objects in a data set used as the starting point for such an analysis where users do not need an in-depth requisite understanding of the underlying data tables and complicated object associations to explore a data set or perform ad hoc analysis. In addition, there is no system that tracks and displays the steps performed for graphically down-selecting and filtering objects of a data set, presenting down-selected and filtered objects on a "dashboard" and then saving the analysis operations and dashboard such that it can be shared with others, or used again.

SUMMARY

Embodiments of systems and methods of an interaction and analysis user interface for exploring and filtering a set of data objects based on both an ontology and queries of values in the data set are disclosed herein. The system allows the set of data objects to be filtered and displayed on a user interface "dashboard" that can be configured to display charts and visualizations. The charts and visualizations can be saved and re-used by the same user, or shared with a different user. The filtering operations can also be saved and reused by the user, or shared with a different user for use with another data set. In an example, a user interface supports an initial selection of a set of data objects by selecting an object type, the types of objects defined by an ontology. Various data filtering can be performed on the set of data objects to drill-down and explore the data set. A list of object types linked to the selected object type can be determined based on the ontology and displayed. This is an example of filtering that is done without the need for a data content query because it uses the ontology instead (e.g., to determine which object types are linked). Displaying the linked object types obviates user knowledge of the linked (or associated) object types allowing them to more easily explore the data set. A linked object type can be selected as a filter, and a list of selectable properties of the selected linked object type and displayed. A user can also select a property as a filter, and a query is performed to generate a list of possible values of the selected property, obviating the need for the user to know prior information about the values. A user can then select a value, from the list of values, as a filter. Information of a subset of the set of data objects can be displayed in one or more visualizations and charts, the subset being results based on filtering the set of data objects using the selected linked object, property, and value.

In one innovation, a system includes one or more non-transitory computer storage mediums configured to store at least a plurality of sets of data objects including at least a first set of data objects of a first object type and a second set of data objects of a second object type. The one or more non-transitory computer storage mediums are also configured to store computer-executable instructions. The system further includes one or more computer hardware processors in communication with the one or more non-transitory computer storage mediums. The one or more computer hardware processors are configured to execute the computer-executable instructions to at least receive a user selection of the first object type indicating to perform filtering operations on the first set of data objects, generate and display a list of object types linked to the first object type based on an ontology, receive a user selection of the second object type from the list of object types linked to the first object type, generate and display a list of properties of the second object type based on the ontology, receive a user selection of a first property from the list of properties, perform a query of the first property of the second set of data objects to determine values associated with the first property, and display a selectable list of the values determined, receive a user selection of a first value from the list of the values, and display information related to a subset of data objects of the first set of data objects on one or more visualizations on a display, the subset of data objects being a portion of the first set of data objects that are linked to data objects in the second set of data objects that have a first property value of the first value.

Such systems may include other one or more other aspects described herein in various embodiments. For example, in some embodiments, the one or more computer hardware processors are further configured to execute the computer-executable instructions to receive a user input of filter information associated with the first set of data objects, and (i) filter the first data set of data objects using the filter information prior to said generate and display a list of object types linked to the first object type, or (ii) filter the first data set of data objects using the filter information after said display of information related to a subset of data objects of the first set of data objects on one or more visualizations on a display. In another aspect, the one or more computer hardware processors are further configured to execute the computer-executable instructions to generate and display a search bar for receiving the user input of filter information.

In another aspect, the one or more computer hardware processors are further configured to execute the computer-executable instructions to receive a user selection of a filtering operation displayed in the track bar, and generate and display one or more visualizations on the display depicting the filter operations applied to the first set of data objects up to and including the selected filtering operation. For example, such a selection can be received from a pointing device that is used to click-on a displayed filtering operation in the tracker bar. In another aspect, the one or more computer hardware processors are further configured to execute the computer-executable instructions to display groups of object types in the plurality of sets of data objects. In another aspect, the one or more computer hardware processors are further configured to execute the computer-executable instructions to display the groupings of object types in groups of related categories. In another aspect, the one or more visualizations include one or more of a listogram, a timeline, a numeric distribution, a choropleth map, a clustering map, a pivot table, a single statistic, aircraft layout, or a top common properties chart.

Another innovation includes a method for performing filtering operations on a set of data objects, the method including receiving a user selection of a first object type indicating to perform filtering operations on a first set of data objects of a plurality of sets of data objects, the plurality of sets of data objects including at least the first set of data objects of the first object type and a second set of data objects of a second object type, generating and displaying a list of object types linked to the first object type based on an ontology, receiving a user selection of the second object type from the list of object types linked to the first object type, generating and displaying a list of properties of the second object type based on the ontology, receiving a user selection of a first property from the list of properties, performing a query of the first property of the second set of data objects to determine values associated with the first property, and displaying a selectable list of the values determined, receiving a user selection of a first value from the list of the values, and displaying information related to a subset of data objects of the first set of data objects on one or more visualizations on a display, the subset of data objects being a portion of the first set of data objects that are linked to data objects in the second set of data objects that have a first property value of the first value, the method performed by one or more computer hardware processors configured to execute computer-executable instructions on one or more non-transitory computer storage mediums.

Such methods may include other one or more other aspects in various embodiments. In one aspect, the method further comprises storing, on the one or more non-transitory computer storage mediums, the plurality of sets of data objects, and storing, on the one or more non-transitory computer storage mediums, the computer-executable instructions. In another aspect, the method further comprises receiving a user input of filter information associated with the first set of data objects, and further filtering the first data set of data objects using the filter information prior to said generating and displaying the list of object types linked to the first object type. In another aspect, the method further comprises receiving a user input of filter information associated with the first set of data objects, and further filtering the first data set of data objects using the filter information after said displaying information on one or more visualizations on the display.

Another innovation includes a method including receiving a user selection of a first object type indicating to perform filtering operations on a first set of data objects of a plurality of sets of data objects, the plurality of sets of data objects including at least the first set of data objects of the first object type and a second set of data objects of a second object type, determining object types linked to the first object type based on an ontology, receiving input of the second object type from the object types linked to the first object type, determining properties of the second object type based on the ontology, receiving input of a first property of the determined properties of the second object type for filtering the first set of data objects, determining values associated with the first property, receiving input of a first value from determined values, and displaying information related to a subset of data objects of the first set of data objects on one or more visualizations on a display, the subset of data objects being a portion of the first set of data objects that are linked to data objects in the second set of data objects that have a first property value of the first value, where the method is performed by one or more computer hardware processors configured to execute computer-executable instructions on one or more non-transitory computer storage mediums.

Accordingly, in various embodiments, large amounts of data are automatically and dynamically filtered interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, filter, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1A:
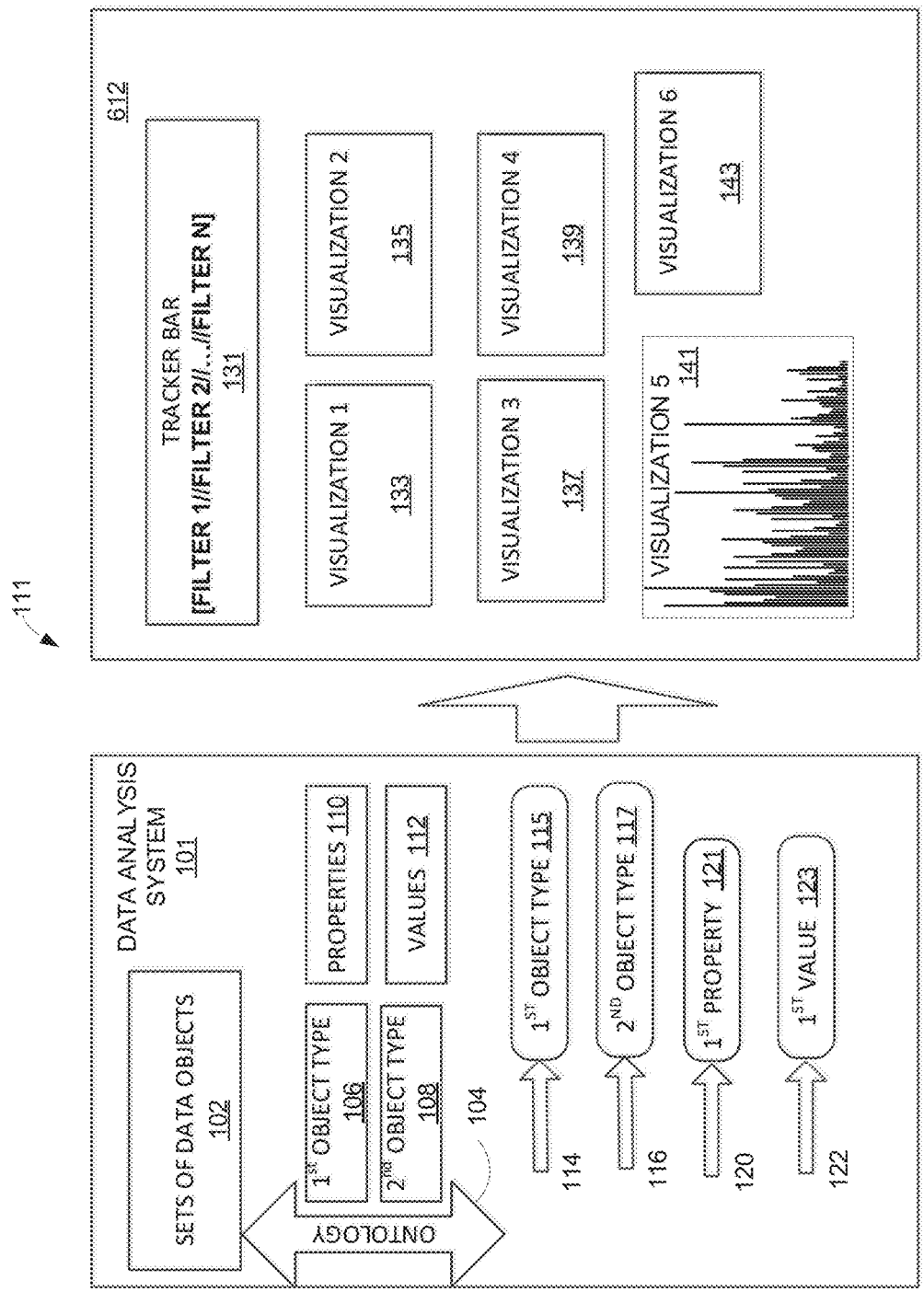
FIG. 1A is a block diagram of a data analysis system for exploring and filtering a data set based on an ontology and queries of values in the data set.

Described herein are examples of systems, software applications and user interfaces for exploring and filtering a set of data objects. Filtering operations may be based on using an ontology for filtering (i.e., where a query of the data content in a data set is not performed but instead predetermined ontological information is used for filtering). For example, a filtering operation that uses predetermined links between data objects to segregate the data. Filtering operations may also be based on using a query of data in the data set (i.e., where a query of the actual data content in a data set is performed). For example, a query of data in the data set may be a query relating to a particular value of a property of a data object, and one or more of the values are returned as a result of the query.

Such systems can allow the set of data objects to be filtered and displayed on a user interface "dashboard" that can be configured to display charts and visualizations. In an exemplary workflow for exploring a set of data objects, an object-centric user interface supports initial selection of a set of data objects, the types of which are defined by an ontology. A list of object types indicating data objects linked to the set of data objects can be determined based on the ontology and displayed for the user to select from so that the user does not need to know beforehand the different associations between the data objects. A linked object type can be selected as a filter, and a list of selectable properties of the selected linked object type is determined based on the ontology, and displayed. A user can also select a property as a filter, and a query is performed to generate a list of possible values of the selected property, obviating the need for the user to know prior information about the values. A user can then select a value, from the list of values, as a filter. Information of a subset of the set of data objects is displayed in one or more visualizations and charts, the subset being results based on filtering the set of data objects using the selected linked object, property, and value.

The workflows for exploring the set of data objects can be varied depending on the user's desires and the exploration of the data that is needed. For example, the set of data objects can be filtered based on one or more criteria before, or after, filtering based on a linked object. The dashboard is modular and easily configurable by the user, and information in the charts is selectable to provide the user an easy way to filter their intermediate results further using the charts and visualizations. Using this filtering and dashboard functionality, the end-user can think across concepts of what they are trying to explore and do not have to know the underlying data tables and the data-structure concepts to effectively perform analysis.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time series data is an example of data that may be associated with a batch. In one example, a batch may refer to a process where a material or substance is subject to one or more events (or processes) that cause one or more changes to the material or substance, for example, a grouping of related events processes or operations may comprise a batch. In another example, a batch may refer to the occurrence of a certain thing, a certain event, or portion of an event, that occurs numerous times.

In another example, the instances when a submarine submerges between 33 feet and 330 feet may be referred to as a batch, and during such a batch numerous data may be collected regarding the equipment operating on the submarine, or information relating to integrity of the hull maybe collected. In another example, a batch may refer to a circumstance or situation when a system, or a portion of a system, operates and is monitored over a period of time. In another example, a car driving from point A to Point B, or for a certain duration of time, can be referred to as a batch. Similarly, a system operating (e.g., to heat water, refine oil, make food products, travel from point A to point B, etc.) may be referred to as a batch. In another example, the processing of a material (any substance, e.g., water, beer, concrete, oil, produce, paint, etc.) being operated on by a system may also be referred to as a batch. One or more sensors or processes can be used to collect data associated with a batch, and/or one or more users can monitor a batch and provide input to a batch.

A portion of an event or process may also be referred to batch if information is collected during the event or process. For example, a batch may refer to a baseball pitch/hit event, where a movement of a baseball (e.g., position, velocity, trajectory, rotation, etc.) is monitored as it travels from the pitcher's hand to the batter, and then from the batter's bat to the outfield. A batch may also refer to a portion of the baseball pitch/hit event, for example, only the portion from where a bat hits the baseball and the baseball travels to the outfield. In some cases, batch data may be collected for a baseball pitch/hit event and then later it is decided to look at a portion of the collected data as a separate batch, for example, only the portion of the movement of the baseball after the baseball is hit by the bat. In such cases, the pitch/hit batch can be analyzed by storing as separate metadata the exact start and end times of each time during a game a baseball leaves the pitcher's hand, gets hit by the bat and travels to the outfield during a pitch/hit event. Subsequently, a search can be done on the pitch/hit event batch data to identify a set of start/stop times when the baseball is hit by the bat and has traveled 100 feet from the batter, and those can be considered to be a set of batches and analyzed.

In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of a substance that is associated with the batch and performing quality analysis of the substance. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time series data collected by each sensor, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time Series Data: A series of information referenced to time. For example, a series of information that is sensed, collected, determined, and/or stored over a period of time, such that the information may be referenced by the time that it was sensed, collected, determined, and/or stored. As used herein in reference to time series data, "information" is a broad term that may include sensor information and/or other types information that is collected either in reference to an instance of time or during a defined time period (e.g., milliseconds, seconds, minutes, hours, days, weeks, months, years, etc.). Time series data can include the number of times an event occurs during a time period. Some examples of time series data are provided here, but these examples are not meant to limit the type of information that can be included in time series data. In some examples, time series of information may be generated by a sensor monitoring a characteristic, for example, temperature, pressure, pH, light or radiation, dissolved oxygen, carbon dioxide, gas composition, size, vibration, or movement. In some examples, time series data may be a count of a certain occurrence over a designated period of time, e.g., the number of people that pass through a turnstile every minute during a week; the number of cars that travel past a certain location in a city every five minutes for a year; the count of telephone calls a call center during consecutive 15 minute periods for a year; and the amount of money all the cash registers of a store collect during 30 minute time periods for a year; or the number of times a certain computer operation occurs (e.g., an error log or message is generated, a query is made, a certain communication is made) in a certain time period. In some examples, the series of information is determined by using data from one sensor and other information, for example, data from another sensor or stored data. In another example the series information is determined by a user's input, for example, where the user input is a quality characterization. Time series data, or a time series data set, may also be referred to herein simply as "time series."

FIG. 1A is a high-level block diagram of a data analysis system 101 implemented in a computing environment 111 which may be used for exploring and filtering a data set, where the filtering can be based on ontology (e.g., links associated with data object types) and queries of particular properties and values of a property associated with a data object in the data set. The data analysis system 101 may be used, in conjunction with the data management system illustrated and described in reference to FIG. 1B. For example, to explore a data set that is built or transformed by the data management system. The data analysis system 101 can be configured to perform functionality described herein, for example, to allow a set of data objects to be filtered and the results displayed on a user interface ("dashboard") that can be configured for displaying charts and visualizations for an analysis workflow.

The data analysis system 101 can include one or more non-transitory computer storage mediums configured to store a plurality of sets of data objects 102. An ontology 104 of stored information provides a data model for storage of data in one or more databases where the sets of data objects 102 can reside. The functionality described herein can be part of a workflow for data analysis in various workflows for data analysis. For example, in a workflow filtering may be performed on a set of data objects to drill down to a segregate and display a particular portion of the data. In some embodiments, the filtering can be a series of filters applied in a sequence. In various embodiments, filtering can be based on one or more of a data object linked to another data object, a property of a data object, and/or a particular value of a property.

In an example, a first data object type of data objects in a data set can be selected and other data object types that are linked to the first data object can be displayed on a selectable list. This advantageously obviates the need for a user to have knowledge of these linked data object relationships. Selection of one of the other data object types, from the list, "filters" the set of data object to produce a subset of the original set of data objects which can be displayed and/or further filtered. The subset includes data objects that are linked to the first data object type as defined by data stored in the ontology. In other words, this type of filtering is based on the known ontologically defined relationships of the data objects, and as such this type of filtering does not require a data content query to retrieve data in the data set. As an example, if first data object type is automobiles the list of other data objects (i.e., that are linked to the object type automobile) can include data objects types of manufacturer and location. Selecting manufacturer can generate a visualization of properties of the data object type manufacturer, and this is done without performing a query of the actual data contained in the data set. Similarly, selecting location can generate a visualization of properties of the data object type location. In various embodiments, such filtering using the relationships of the linked data objects can be repeated numerous times to explore the data without needing to perform any queries into the actual data itself. As this filtering is performed, the provenance of the filtering can be generated and displayed (e.g., in a tracker bar) to help an analyst navigate the filtering operations.

In additional filtering operations, a particular property can be selected to further filter the data set, and additional visualization can be generated displayed related to various values of the selected property, the values being actual stored data or content of the data set. In other words, such filtering can utilize the data model provided by the ontology, for example, when a first set of data objects of a first object type is be filtered based on a second data object of a second object type that is linked to the first object type. In another example, filtering of the first set of data object is performed based on a property of data object, and/or a particular value of a property of the data object. In various embodiments, data objects can be iteratively filtered using a combination if filtering by linked data objects, properties, and values of properties. In various embodiments, the data set can be filtered by, for example, a property of the first selected data object type, visualizations of the data can be generated and displayed, and the data can be further filtered by a linked data object type. Other sequences of filtering are possible, some be further described in reference to FIG. 7 and FIG. 8. In any of such filtering workflows, various plots, charts, and other graphical visualizations may be displayed as a result of the filtering.

In the example illustrated in FIG. 1A, the sets of data objects 102 can include at least a first set of data objects of a first object type 106 and a second set of data objects of a second object type 108. The computer storage mediums can store computer-executable instructions which configure the data analysis system 101 to perform data analysis workflows based on user selections and input. The data analysis system 101 includes computer hardware processors configured to execute computer executable instructions to perform a process or method for analyzing the sets of data objects 102 (e.g., perform data analysis workflows; "workflow"). As illustrated in FIG. 1A, an exemplary workflow can include receiving a user selection 114 of the first object type 115 indicating to perform a filtering operation on the first set of data objects, and generating and displaying a list of object types linked to the first object type 115. This type of filtering utilizes the ontology that defines associations between data object types to provide the object types linked to the first object type (that is, rather than performing a data query). The workflow can further include receiving a user selection 116 of a second object type 117 from the list of object types linked to the first object type 115, and generate and display a list of properties of the second object type 117 based on the ontology. Again, this type of filtering utilizes the ontology that defines associations between data object types properties to generate and display the list of properties (rather than a data query). Using the ontology to facilitate filtering provides time and resource advantages because the relationships are already known (defined by the ontology) and data query resources are not used for this type or filtering. In various data analysis workflows, many variations and sequences of filtering utilizing the ontology can be performed, alone or on conjunction with other types of filtering.

As an example of additional filtering that may be performed, a user selection 120 of a first property 121 from the list of properties can be received by the data analysis system 101, and a data query of the first property 121 of the second set of data objects can be performed to determine the values associated with a first property 121, and a selectable list of the determined values can be displayed. Such filtering is an example of filtering utilizing a data query (rather than the ontology). Another user selection 122 of a first value 123 of the values on the selectable list of values can be received by the data analysis system 101. As a result, the data analysis system 101 then may display information related to a subset of data objects of the first set of data objects in one or more visualizations on a display 612, where the subset of data objects being a portion of the first set of data objects that are linked to data objects in the second set of data objects that have a first property value 121 of the first value 123. Such filtering sequences that utilize both an ontology to conduct certain filtering operations, and data queries to conduct other filtering operations, provides unique and powerful filtering workflows that may be performed in a variety of different sequences of operations.

FIG. 1A also illustrates an example of several visualizations 133, 135, 137, 139, 141, 143 that can be rendered on a display 612 during the data analysis and as a result of the filtering. The displayed visualizations (e.g., charts, plots, etc.) can be arranged and configured to a user's preference such that the layout is modular and easily configurable by the user, and the visualizations themselves can be resized and otherwise optimized for the particular analysis being performed, or the user's preference. Various chart types may be displayed, including for example, one or more listograms, timelines, numeric distributions, chloropleth maps, clustering maps, pivot tables, a single statistic (for example, a single metric aggregation value for a given property), aircraft layout, and top properties (the chart to display the properties that are the most shared between the objects in the current search set). Additional plots, charts and other types of visualizations may be displayed on the display 612, and various embodiments anti-support various workflows. In some embodiments, these configurations can be saved for the user to use at a later point in time, or they can be shared with other users.

The computer hardware processors of the data analysis system 101 can also be configured to execute the computer executable instructions to generate and display a tracker bar 131 on the display 612. The tracker bar 131 depicts the sequence of filtering operations that have been applied to the first set of data objects. The filtering operations may include, for example, filtering data objects using a particular object type, a property of the object, and/or the value of a property. Such filtering can be done in various sequences, and as the filtering is performed or selected the that the tracker bar 131 depicts the one or more user selections of the filtering operations received by the data analysis system 101 and applied to the data sets. For example, a series of filtering operations that have been performed by the data analysis system 101 based on user selections received by the data analysis system 101 can be depicted, in order, in the tracker bar 131. In addition, if a user wants to go back to a certain point in the workflow, a user selection can be made of a filtering operation in the tracker bar 131, and this can result in stepping back the series of filtering to the point of the selected filtering operation, and plots and charts corresponding to the indicated point of this filtering operations are redisplayed.

Figure 1B:
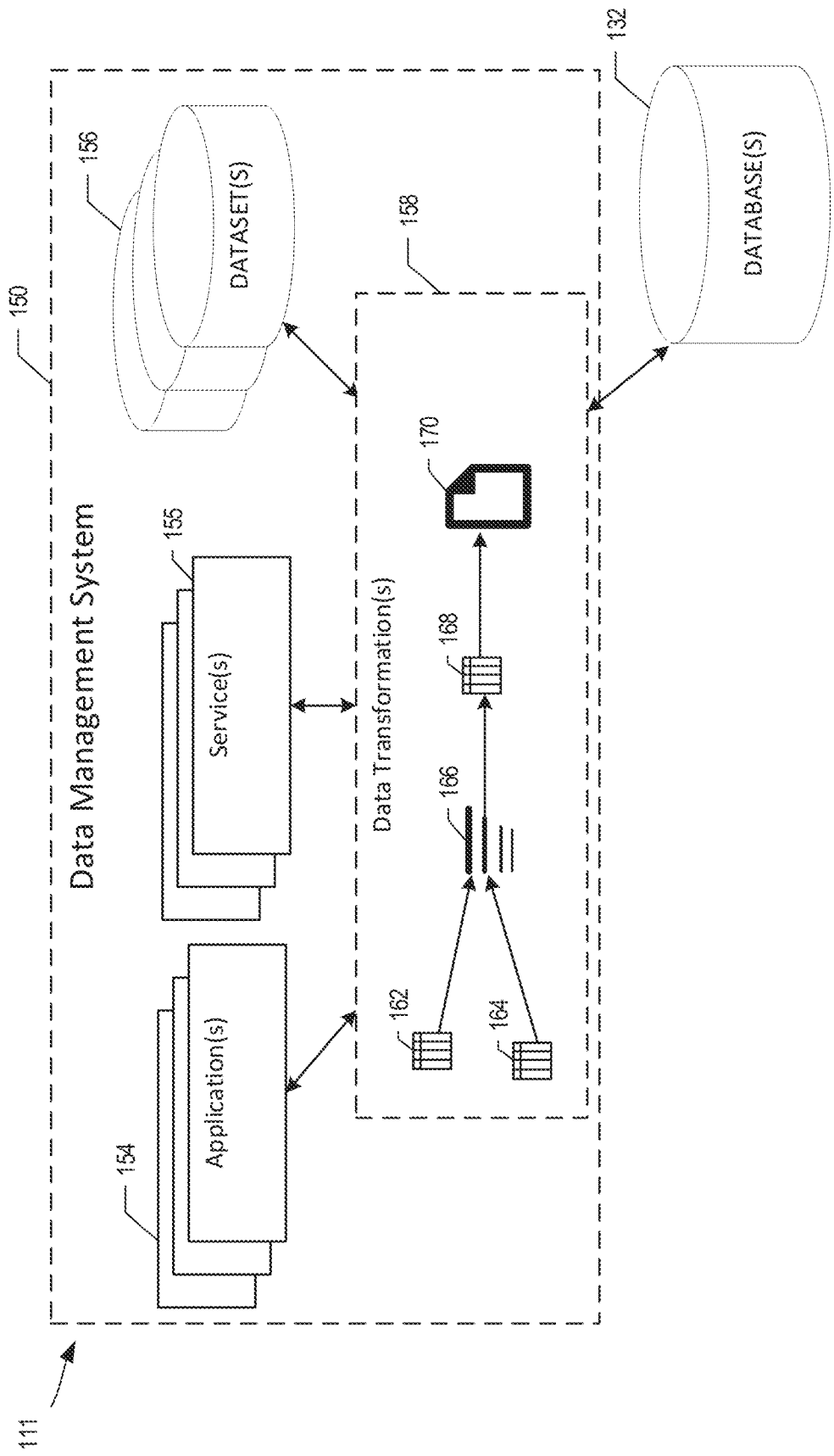
FIG. 1B is a block diagram illustrating a data management system for use with data analysis system, according to some embodiments of the present disclosure.

FIG. 1B is a block diagram illustrating a data management system for use with the data analysis system illustrated in FIG. 1A, according to some embodiments of the present disclosure. In particular, the data management system 150 can be used with the quality issue investigation system 100 described above with respect to FIG. 1A. In the embodiments of FIG. 1B, a computing environment 111 can be similar to, overlap with, and/or be used in conjunction with the computing environment 111 of FIG. 1A. For example, the computing environment 111 can include a database 132, which may be similar to the database 132 in the computing environment 111 of FIG. 1A. However, the computing environment 111 can also include a data management system 150.

The example data management system 150 includes one or more applications 154, one or more services 155, one or more initial datasets 156, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter data sets, and/or configure dataset transformation processes or builds. The one or more services 155 can include services that can trigger the data transformation builds and API services for receiving and transmitting data. The one or more initial datasets 156 can be automatically retrieved from external sources and/or can be manually imported by a user. The one or more initial datasets 156 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Each of the steps in the example data transformation process 158 can be recorded by the data management system 150 and made available as a resource to data analysis system 101. For example, a resource can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. As well as being versioned, a dataset may be immutable. A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system. In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any. As an example, if the build service receives a push build command with dataset R1 as the target, then the build service would determine all downstream datasets that are not up-to-date with respect to dataset R1 and rebuild them. The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Object-Centric Data Model

Figure 2:
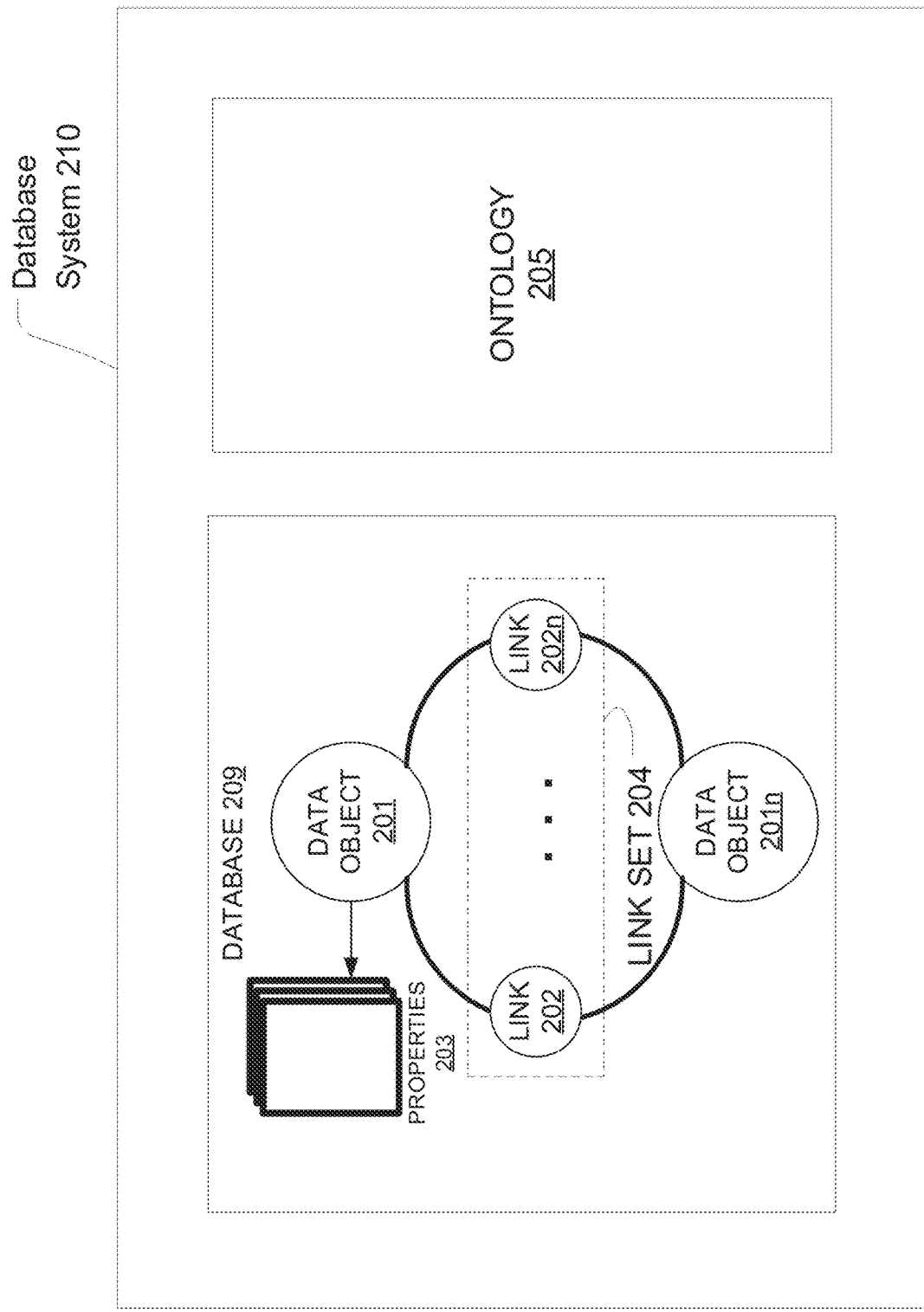
FIG. 2 illustrates one embodiment of a database system using an ontology.

FIG. 2 illustrates an object-centric conceptual data model according to an embodiment. To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information. In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205. Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document. Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
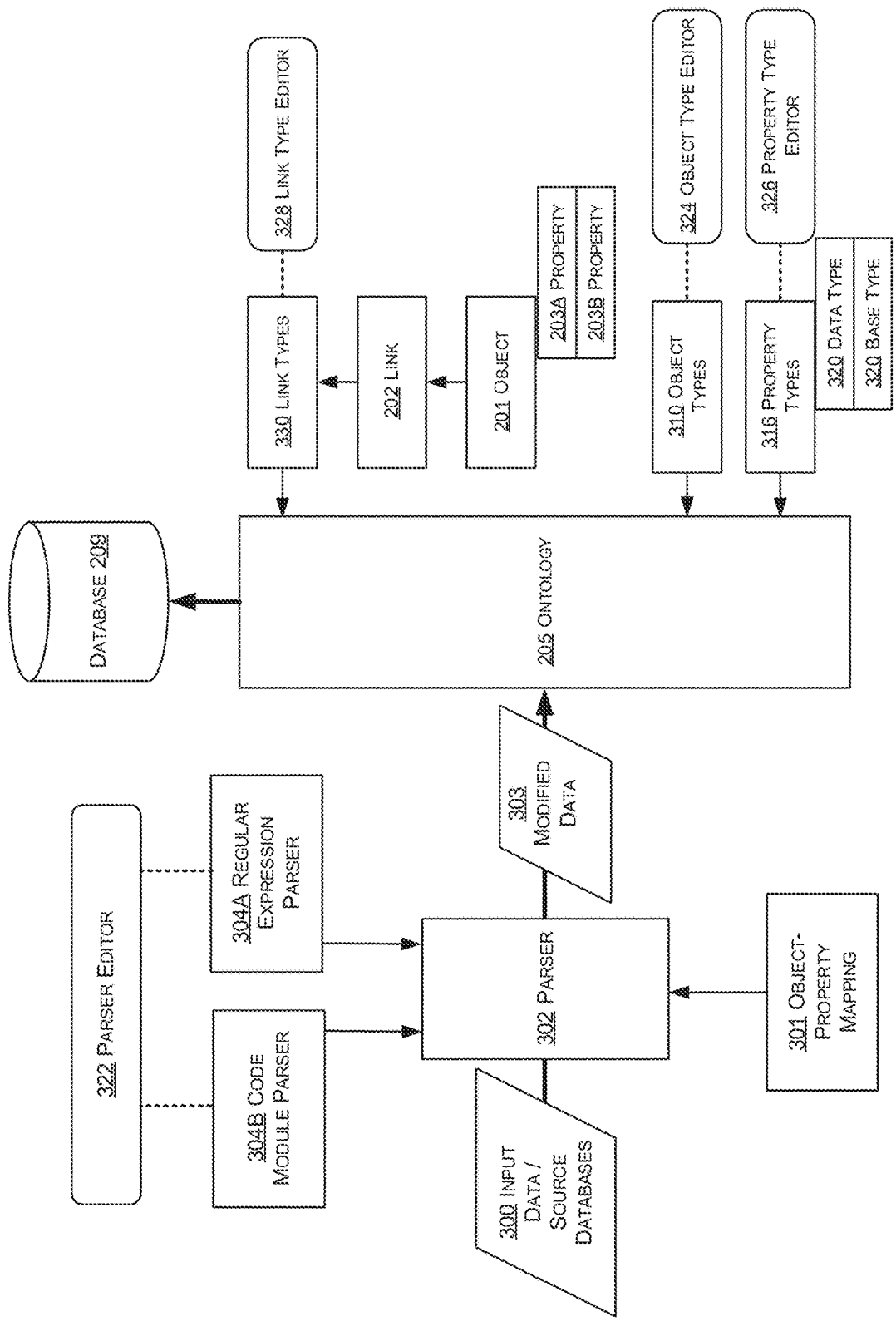
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

The properties, objects, and links (e.g. relationships) between the objects can be visualized using a graphical user interface (GUI). For example, FIG. 4 displays a user interface showing a graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. In this embodiment, the data objects include person objects 421, 422, 423, 424, 425, and 426; a flight object 427; a financial account 428; and a computer object 429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 4:
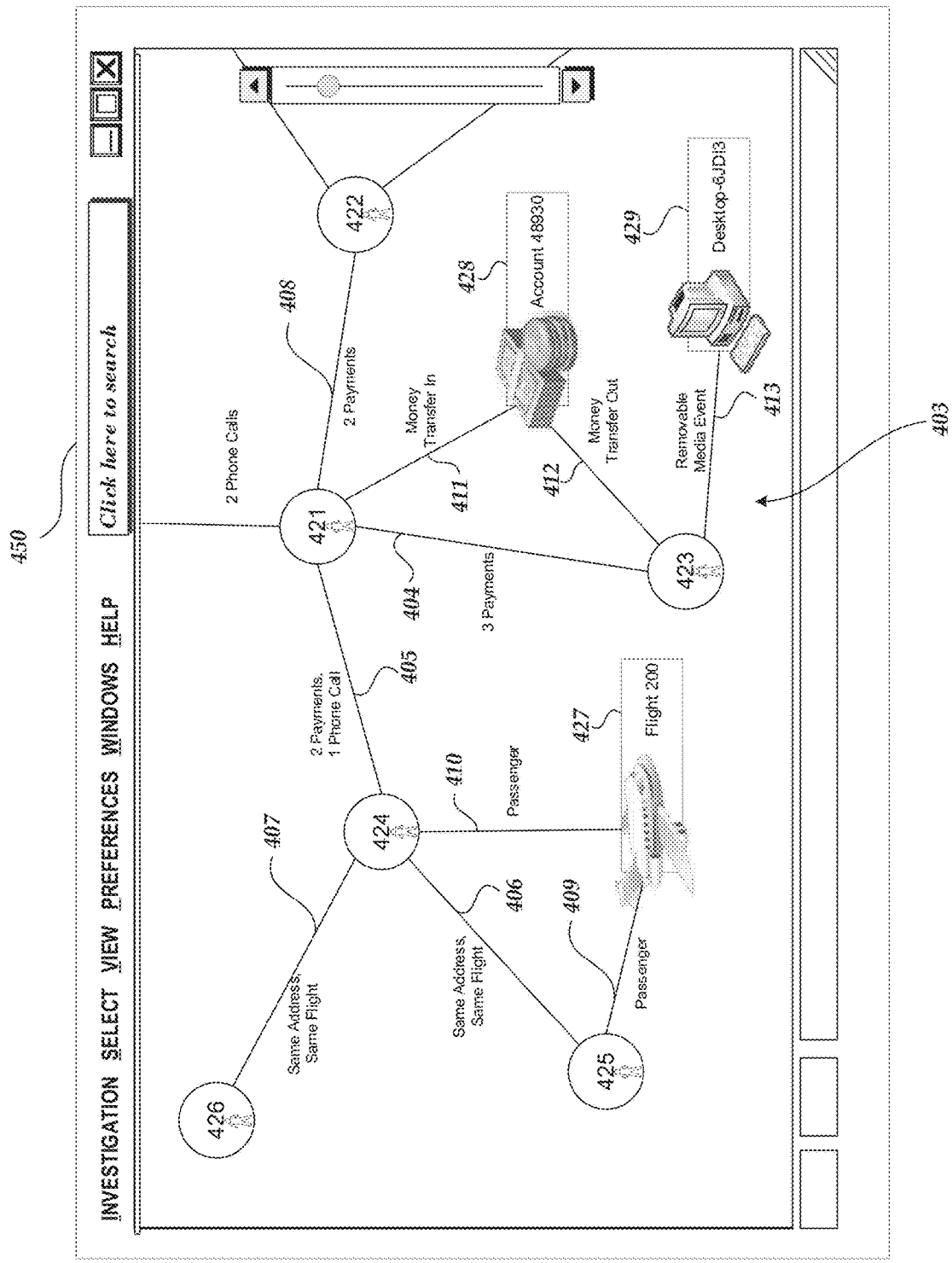
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Advantageously, the present disclosure allows users to interact and analyze electronic data in a more analytically useful way. Graphical user interfaces allow the user to visualize otherwise obscure relationships and patterns between different data objects.

The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

Figure 5:
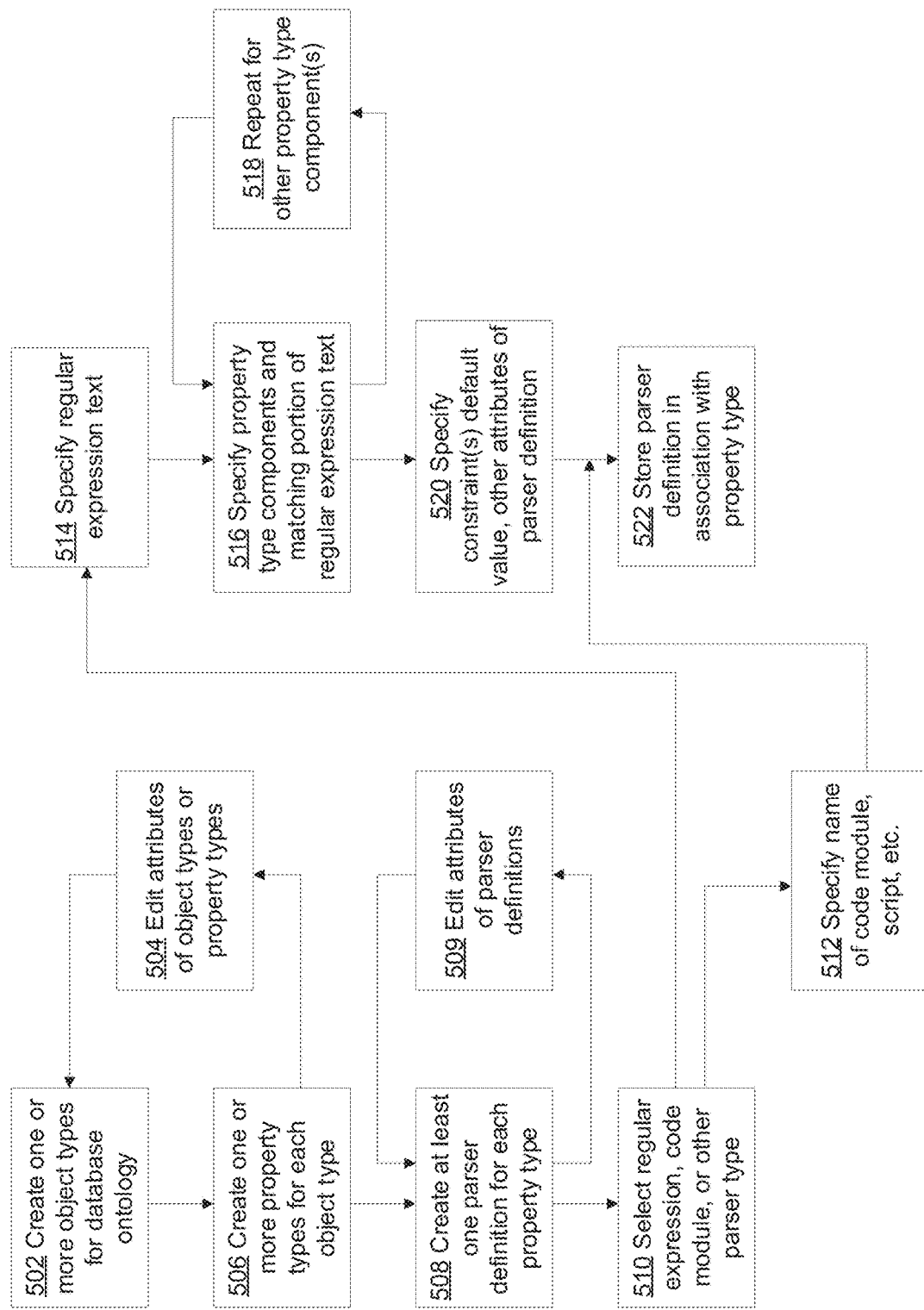
FIG. 5 illustrates defining a dynamic ontology for use in creating data in a data store.

FIG. 5 illustrates defining a dynamic ontology for use in creating data in a database. For purposes of illustrating a clear example, steps 502-509 of FIG. 5 are first described at a high level, and details of an example implementation follow the high level description. In step 502, one or more object types are created for a database ontology. In step 506, one or more property types are created for each object type. As indicated in step 504, the attributes of object types or property types of the ontology may be edited or modified at any time. In step 508, at least one parser definition is created for each property type. At step 509, attributes of a parser definition may be edited or modified at any time. In an embodiment, each property type is declared to be representative of one or more object types. A property type is representative of an object type when the property type is intuitively associated with the object type. For example, a property type of "Social Security Number" may be representative of an object type "Person" but not representative of an object type "Business." In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name:First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property. As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. In an embodiment, a user interacts with a computer to perform the following steps to define an object type. Assume for purposes of an example that the new object type is Vehicle. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Vehicle object type. The user assigns a display name of "Vehicle" to the object type.

In an embodiment, a user interacts with the computer to define a property type in a similar manner. The user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property. In various embodiments, validators may comprise regular expressions, a set of fixed values, or a code module.

In an embodiment, defining a property type includes identifying one or more associated words for the property type. The associated words support search functions in large database systems. For example, a property type of "Address" may have an associated word of "home" so that a search in the system for "home" properties will yield "Address" as one result. In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 5, creating a parser definition for a property type at step 508 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display further comprises a Name text entry box that can receive a user-specified name for the parser definition. When the parser type is "regular expression," steps 514-520 are performed. At step 514, regular expression text is specified. For example, when the Parser Type value of combo box is "Regular Expression," a screen display comprises an Expression Pattern text box that can receive a user entry of regular expression pattern text. In step 516, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 520, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 522, the parser definition is stored in association with a property type. For example, selecting the SAVE button causes storing a parser definition based on the values entered in screen display. Parser definitions may be stored in database 209.

The approach of FIG. 5 may be implemented using other mechanisms for creating and specifying the values and elements identified in FIG. 5, and a particular GUI of is not required. Advantageously, use of a dynamic ontology may allow a user to take advantage of an ontological data model, while not constraining himself or herself to a hard-coded ontology. Hard-coded ontologies can be overly simple (i.e. lacking detailed semantic properties, making classification difficult but limiting analysis) or overly complex (i.e. having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontology's semantic properties.

Various methods can be used for of transforming data and creating the data in a database using a dynamic ontology. In one example described here, input data an input data file is received. The input data file may comprise a comma-separated value (CSV) file, a spreadsheet, XML or other input data file format. An object type associated with input data rows of the input data is identified, and one or more property types associated with input data fields of the input data are identified. The object-property mapping may specify that input data comprises rows corresponding to object type PERSON and fields corresponding to property type components LAST_NAME, FIRST_NAME of property type NAME. The object-property mapping may be integrated into input data or may be stored as metadata in association with a data input tool. A row of data is read from the input data, and one or more field values are identified based on delimiters or other field identifiers in the input data. Then, a set of parser definitions associated with the property type of a particular input data field is selected. For example, metadata stored as part of creating a property type specifies a set of parser definitions, as previously described. The next parser definition is applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition results in a match to the input data, a property instance is created, and the input data field value is stored in a property of the property type associated with the matching sub-definition of the parser definition. If no match occurs, then control transfers to test whether other parser definitions match the same input data value. As an example, a property editing wizard in which multiple parsers have been created for a particular property, and through a process loop each of the multiple parsers can be used in matching input data. If no match occurs to the given parser definition, then any other parser definitions for that property type are matched until either no match occurs, or no other parser definitions are available. If a grouping is empty, then the component is filled by the default value for that component, if it exists. If no other parser definitions are available, then an error can be raised or the property is discarded. The preceding steps are repeated for all other values and rows in the input data until the process has transformed all the input data into properties in memory. In a next step, an object of the correct object type is instantiated. For example, the object-property mapping may specify an object type for particular input data, and that type of object is instantiated. The newly created object is associated in memory with the properties that are already in memory. The resulting object is stored in the database.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

Figure 6:
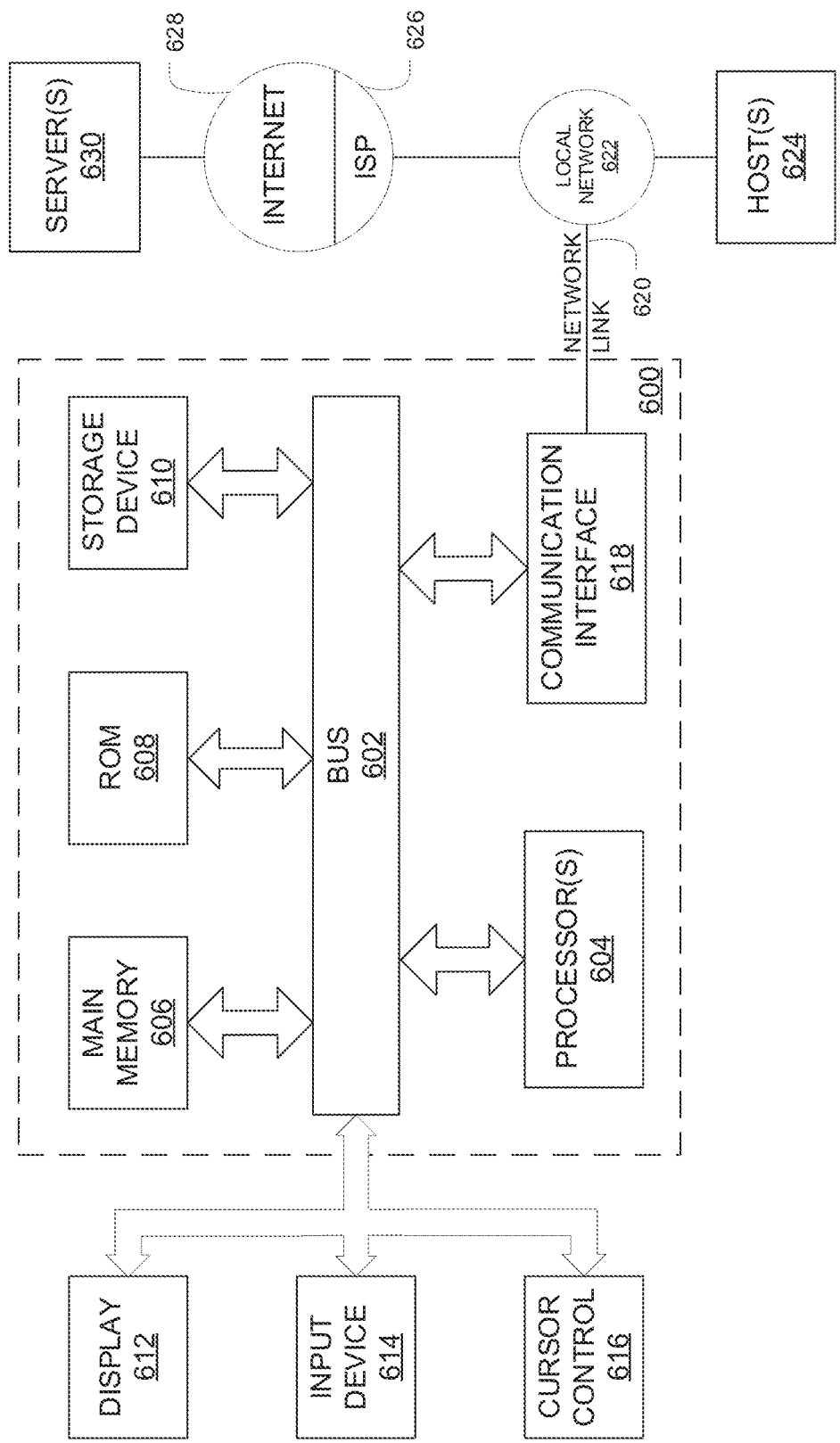
FIG. 6 illustrates a computer system with which certain methods discussed herein may be implemented.

FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media. Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system 600). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 7:
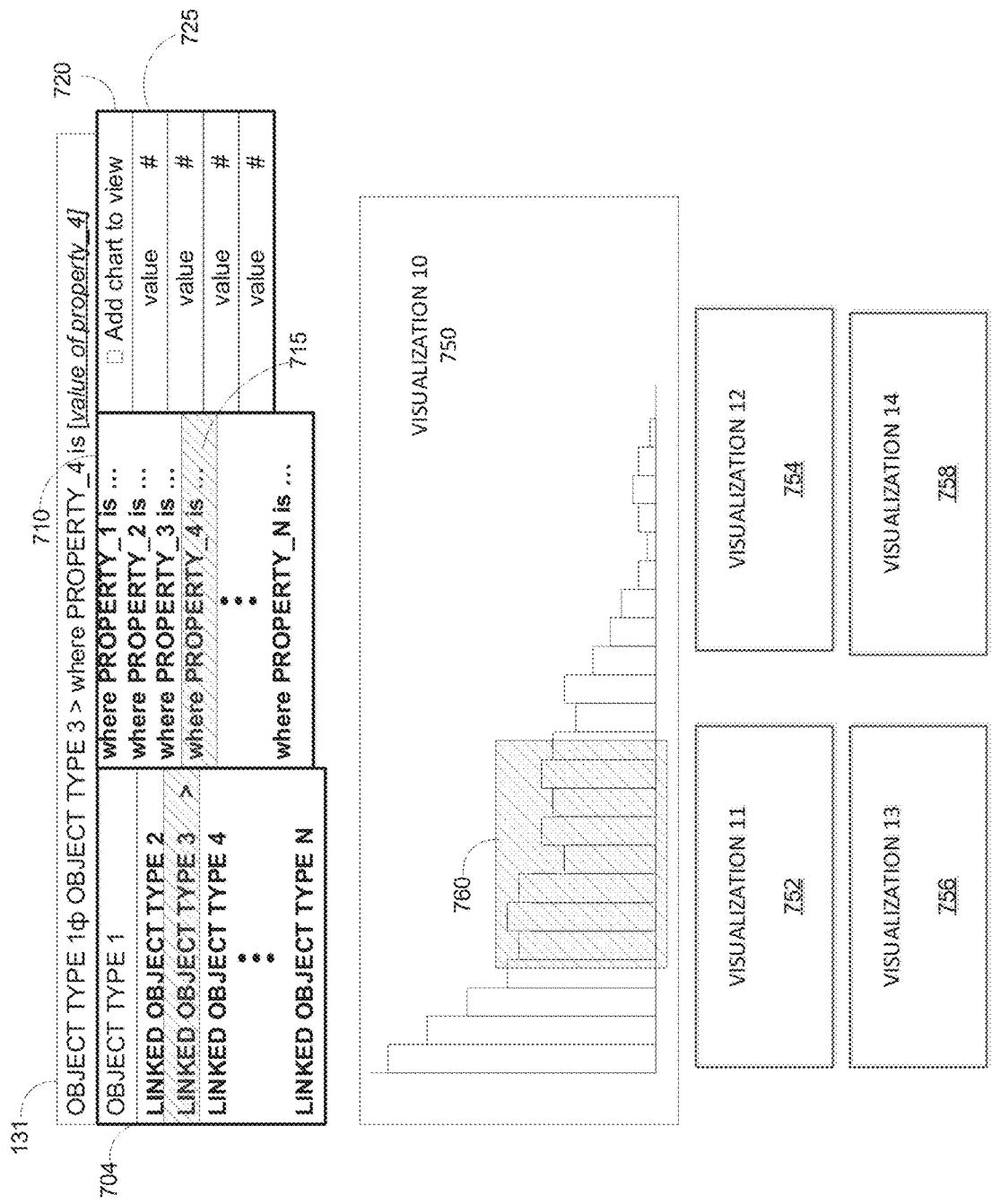
FIG. 7 illustrates an example of portions of a user interface that may be generated and displayed to perform filtering of a set of data objects and other data analysis.

FIG. 7 illustrates an example of portions of a user interface that may be generated and displayed on the data analysis system described herein to perform filtering operations of a set of data objects and other data analysis operations. The user interface also provides visualizations to a user relating to the filtering operations. The described functionality and illustrated user interfaces are some examples which may be implemented in various embodiments of data analysis systems.

In the illustrated example, the user interface includes a tracker bar 131 (similarly illustrated in FIG. 1). The system uses the tracker bar 131 to display an indication of a sequence of filtering operations that have been performed on a data set (sometimes referred to herein as the "provenance" of the filtering or the analysis) which can help a data analyst in navigating and exploring the data set. As each filtering operation is performed, an indication of that filtering operation is appended to the right side of the tracker bar 131 data field. For example, as illustrated in FIG. 7, the tracker bar 131 indicates that a sequence of filtering operations have been performed on a data set. In this example, OBJECT TYPE 1 was the starting point of the data set exploration. OBJECT TYPE 3 was an object type that was selected to act as a filter, OBJECT TYPE 3 being linked to OBJECT TYPE 1. The tracker bar 131 indicates that OBJECT TYPE 3 is linked to OBJECT TYPE 1 by a symbol, e.g., "ɸ" displayed in the tracker bar 131. The tracker bar 131 also indicates that additional filtering operations have been performed in the sequence of filtering operations. For example, the tracker bar 131 indicates that filtering has been performed based on a selected property, e.g., PROPERTY_4 of OBJECT TYPE 3, and also indicates that filtering has been performed based on the value of PROPERTY_4 being a particular value, e.g., value of property 4. This sequence of filtering is further described below with reference to the menu's and workflow illustrated in FIG. 8.

The combination of filtering using defined ontology relationships (or links) of data objects and filtering using data queries provides unique filtering capabilities that facilitates a user to quickly explore and filter certain data in a data set without requiring the user to have in-depth knowledge of data tables or associations of the data set. When a user selection is made of a first data object type, the system may determine, based on the ontology, other data object types that have links to the first data object and these data objects are displayed for selection to be used as a filter. At least a portion the filtering described in the reference to FIG. 7 can be performed based on the ontology's defined connections (e.g., links) between data objects, rather than making data queries relating to the contents of the data. An advantage of this ontological filtering is that queries of the data set content do not need to be made for such filtering, which saves time and compute resources. Another advantage is that a data analyst exploring a data set does not need an in-depth knowledge of the data set associations and relations (e.g., data table relations) between a first data object type and other data object types. Instead, by providing lists of data objects linked to a starting data object, a data analyst can navigate through the data set without needing an in-depth understanding of the relationships between the various data objects.

In the above example and as illustrated in FIG. 7, OBJECT TYPE 3 is an object type linked to OBJECT TYPE 1, another object type. After the user makes a selection of OBJECT TYPE 1 as a starting point for exploring the data, the data analysis system uses ontology to determine object types that are linked to OBJECT TYPE 1. Then the data analysis system generates a list of the determined object types and provides (on a display) a selectable list 704 of the object types that are linked to OBJECT TYPE 1. For this operation, the data analysis system uses the data object information (e.g., links) defined by the ontology such that a database query is not needed. In this example, the list 704 includes linked OBJECT TYPE 2, linked OBJECT TYPE 3, linked OBJECT TYPE 4, through LINKED OBJECT TYPE N. A selection 705 of linked OBJECT TYPE 3 can be made to be used as a filter for OBJECT TYPE 1, and OBJECT TYPE 3 is appended to the filtering provenance in the filter bar 131. After selection 705 of OBJECT TYPE 3 is made, the data analysis system generates and displays a list of selectable properties 710 of OBJECT TYPE 3. Advantageously, generation of the list of selectable properties 710 is based on the stored ontology data of the OBJECT TYPE 3, and does not require a query of the actual content of the data set. The illustrated example show that a user selection 715 is made selecting "where PROPERTY_4 is . . . " and correspondingly where PROPERTY_4 is appended to the filtering provenance in the filter bar 131. Although not shown in FIG. 7, in some embodiments and workflows, additional navigation or exploration (e.g., filtering) of the data set can be done through iterative operations of using the ontology to determine linked object types, and the results and be displayed and selected by the user.

At this point in the filtering operation the system can receive a user selection/input of a particular value of PROPERTY_4 to filter the data. For this filtering operation, the data analysis system 101 performs a data query of the data content based on the property value selected or entered. In some embodiments the system can receive user input of the value directly into the tracker bar 131 field (e.g., via an input device 614). In some embodiments, the data analysis system can receive user input 725 through a property value menu 720 that is generated and displayed by the data analysis system, and the selected value is appended to the tracker bar 131 to indicate the provenance of the filtering operations. In property value menu 720, various values for the previously selected PROPERTY_4 can be displayed along with the number of these particular values (indicated on the property value menu 720 by the "#" symbol) found in the data being explored. Generation of the number of the particular values in the property value menu 720 is done through a query of the data content and then summing the number or entries for each particular value.

Other filtering operations may be performed in various combinations. For example in reference to the example in FIG. 7, after OBJECT TYPE 1 is selected one or more filtering operations may be performed on the before filtering by the linked OBJECT TYPE 3. Or, after OBJECT TYPE3 is selected, another object type that is linked to OBJECT TYPE 3 may be selected and used for additional filtering.

Accordingly, the filtering operations in the examples of this disclosure are not meant to limit the filtering operations of the disclosed analysis system, but instead illustrate advantages of a sequence of filtering operations where some of the filtering operations are based on an ontology and other filtering operations are based on data queries.

As a result of the filtering operations based on the ontology and based on data content queries, the data analysis system 101 can generate one or more visualizations 750, 752, 754, 756, 758 of various plots and charts depicting the results of the filtering operations. For example, the one or more visualizations can include one or more listograms, timelines, numeric distributions, chloropleth maps, clustering maps, pivot tables, a single statistic chart, aircraft layout chart, and a top properties chart. Each of the charts can be resized to facilitate viewing and analysis. In some embodiments, portions of data displayed in a chart can be selected to further drill-down and explore the data set. For example, FIG. 7 illustrates a selection 760 of a portion of the data shown in the visualization 10 750, and this selection can indicate a selection of certain values (e.g., a range of values) for use for an additional filtering operation. As an analyst performs additional filtering based on the ontology and/or based on data queries of the content of the data set, the tracker bar 131 is updated to indicate the filtering operations performed. In some embodiments, one of the filtering operations indicated in the tracker bar can be selected (e.g., by "clicking" on the entry in the tracker bar 131 using a mouse input device 614 to make a user selection of a certain filtering operation), and data analysis system 101 reverts back to that point in the filtering operations, which makes it easy to explore a new thread of filtering from an existing thread of filtering operations without having to start filtering operations from the beginning.

In some embodiments, the filtering operations generated by an analyst can be stored for future use by the same analyst, or a different analyst, on the same data set or another data set (e.g., a similar data set). Also, the visualizations that are generated can be stored to also be used by the same analyst, or a different analyst, on the same data set or another data set (e.g., a similar data set).

Figure 8:
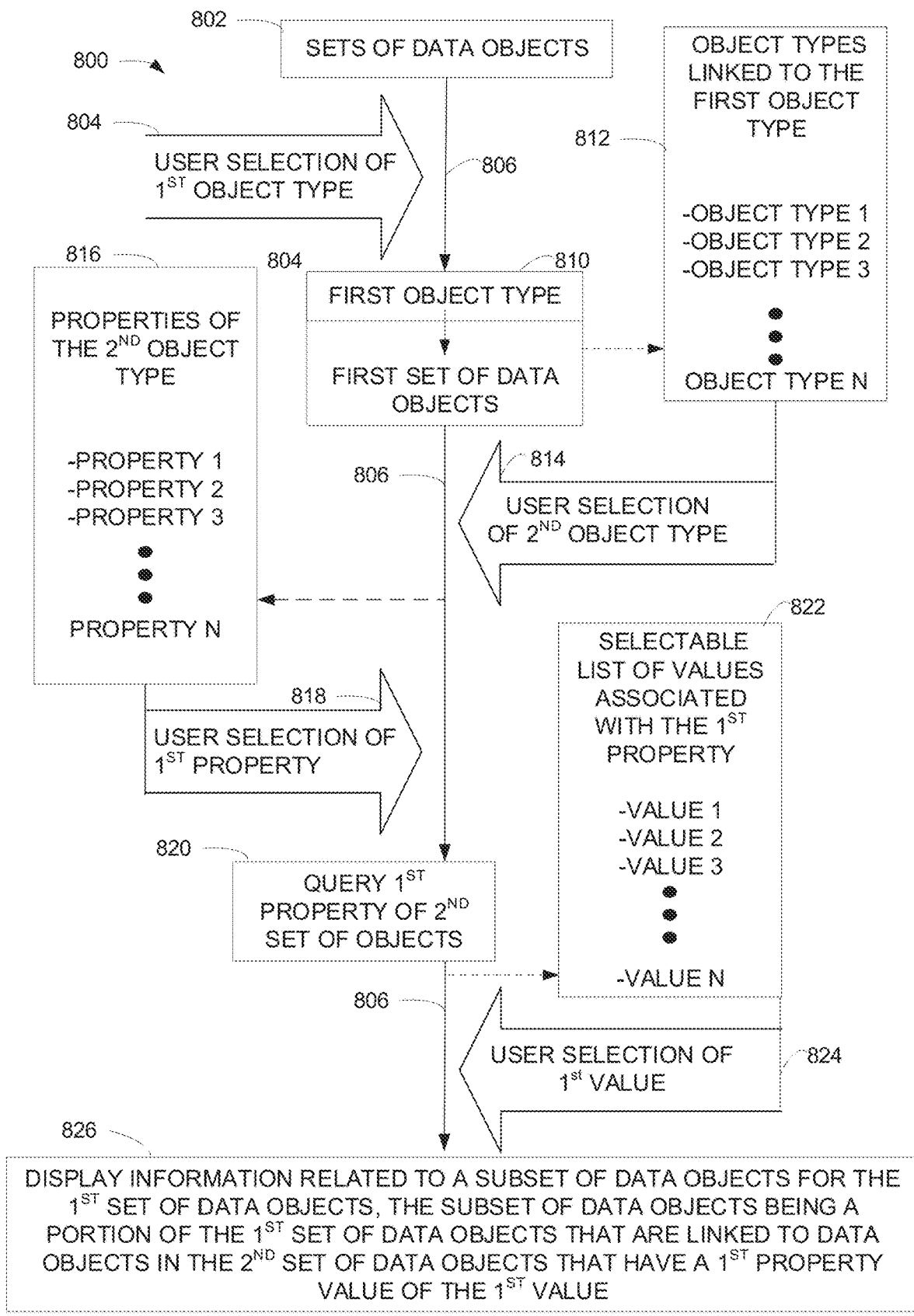
FIG. 8 illustrates examples of workflow functionality implemented on the data analysis system.

FIG. 8 illustrates a particular example of filtering operations workflow functionality 800 implemented on the data analysis system 101 (FIG. 1), according to certain embodiments. Many other examples filtering operations are possible. In fact, design of the data analysis system 101 provides a data analyst to explore and drill down into data sets in a flexible and fluid workflow, that allows exploration of the data set through filtering in one thread of filtering operations, and then allowing the data analyst to step back to a prior point in the filtering operations and explore the data set through filtering down in another thread of filtering operations. The selections indicated in FIG. 8 are user selections provided to the data analysis system 101 via, for example, an input device 614 (e.g., a keyboard or a mouse). The analysis starts with the selection of a set of data objects 802 to be analyzed. The workflow 806 proceeds and a user selection 804 of a first object type is received. The first object type 810 is an object type that is in the set of data objects 802, and the first object type 810 corresponds to a first set of data objects. Data analysis system 101 then receives a user selection of a second object type 814 that is linked to the first object type 810. In various embodiments, the object types that are linked to the first object type may be displayed by the data analysis system 101 in a pop-up menu 812 that provides a user selectable list of object types that are linked to the first object type.

The workflow 806 proceeds in a user selection 818 of a property of the second object type is received by the data analysis system 101. In various embodiments, the various properties of the second object type may be displayed by the data analysis system 101 in a pop-up menu 816 that provides a list of properties of the second object type, each of the displayed properties selectable to provide a user input of a property to be used for filtering the data set. The filtering operations performed on the set of data objects as result of the user selection of a second object type in the user selection of a first property are based on an ontology (e.g., stored data comprising definitions for data object types and respective associated property types, respective link types/definitions associated with data object types, and indications of how data object types may be related to one another) and thus do not require data queries of the actual information content of the set of data objects.

The workflow 806 proceeds and receives a user selection 824 of a first value of the property selection that was previously received by the data analysis system 101. In some embodiments, the value may be selected from a list 822 of values that are associated with the property generated by the data analysis system 101 and displayed for user selection. Alternatively, a user can enter the value using an input device 614. When generating the list 822 of values the data analysis system 101 queries the data content of the properties of the second object type, and can provide in addition to the value the count of the number of data objects of the second object type value whose first property has a particular value. Finally, in the workflow 806, the data analysis system 101 displays information related to a subset of data objects for the first set of data objects the subset of data objects being a portion of the first set of data objects that are linked to data objects and the second set of data objects that have a first property value equal to the first value.

Figure 9:
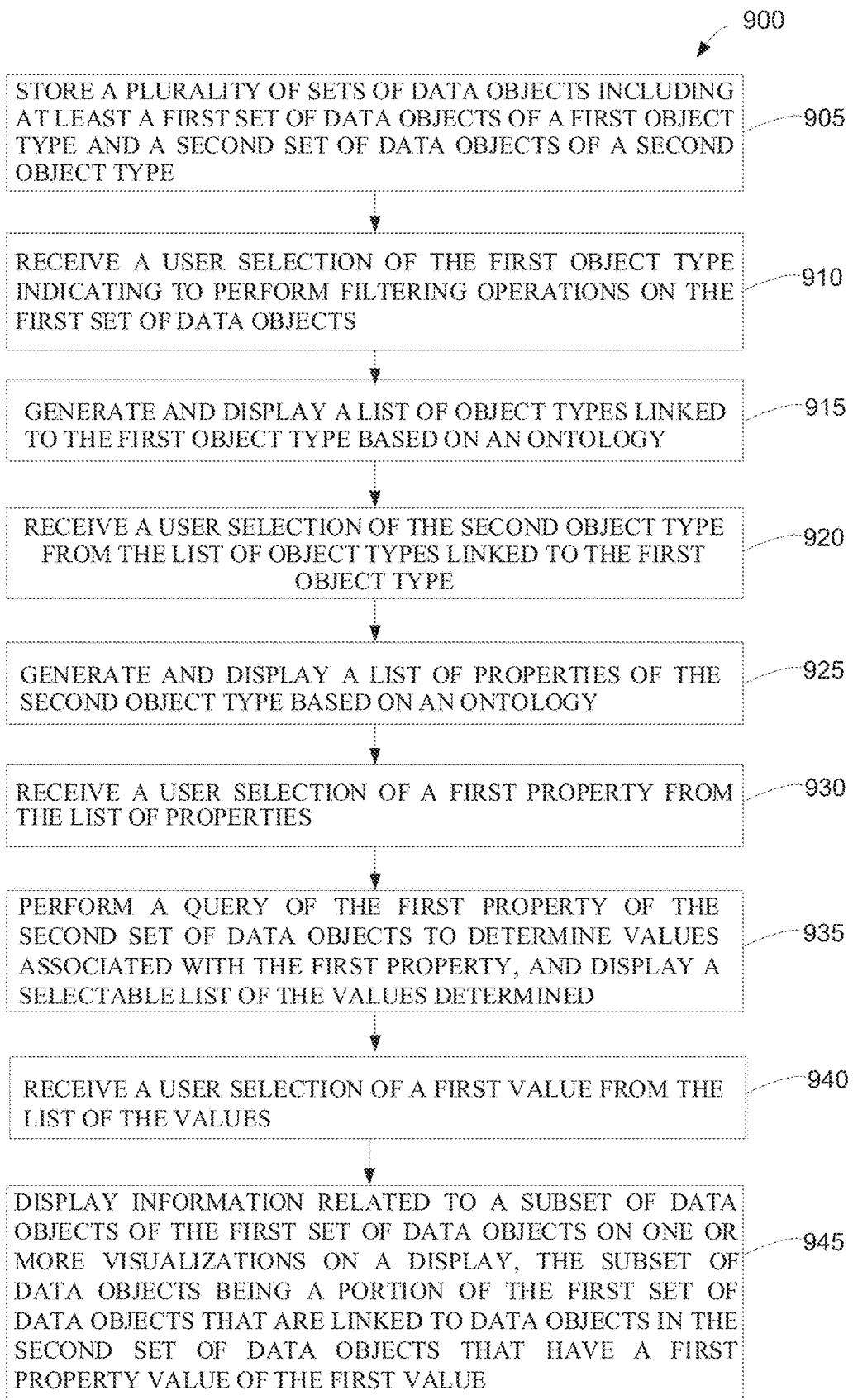
FIG. 9 is a flow diagram illustrating a method for performing data analysis.

FIG. 9 is a flow diagram illustrating a method 900 for performing filtering operations on a set of data objects by, for example, the data analysis system 101 illustrated in FIG. 1 and described throughout this disclosure. The method may be performed by one or more computer hardware processors (e.g., processors 604) configured to execute computer-executable instructions on one or more non-transitory computer storage mediums (e.g., main memory 606 and/or storage device 610). In some embodiments, the method can include storing a plurality of sets of data objects including at least a first set of data objects of a first object type and a second set of data objects of a second object type. In other embodiments, the storing a plurality of sets of data objects including at least a first set of data objects of a first object type and a second set of data objects of a second object type is performed as part of a different method.

At block 910 the method 900 receives a user selection of a first object type indicating to perform filtering operations on a first set of data objects of a plurality of sets of data objects. The plurality of sets of data objects includes at least the first set of data objects of the first object type and a second set of data objects of a second object type. The user selection can be received from an input device 614, or from another input means. At block 915 the method 900 generates and displays a list of object types linked to the first object type based on an ontology. The list of object types can be displayed on, for example, display 612 as illustrated in FIG. 1A and FIG. 6. The data analysis system can perform this portion of the method using stored data of the ontology itself (e.g., link information) such that a data query of the content of the sets of data objects need not be performed for this determination. The method 900 proceeds to block 920 where the data analysis system 101 receives a user selection of the second object type from the list of object types linked to the first object type. The user selection can be received from an input device 614, or from another input means.

The method 900 proceeds to block 925 where the data analysis system generates and displays a list of properties of the second object type based on the ontology. The list of properties can be displayed on, for example, display 612 as illustrated in FIG. 1A and FIG. 6. The method 900 proceeds to block 930 where a user selection of a first property from the list of properties is received by the data analysis system. This user selection can also be received from an input device 614, or from another input means. The method 900 then proceeds to block 935 where the method performs a query of the first property of the second set of data objects to determine values associated with the first property, and displays a selectable list of the values determined. This is a query of the data content of the data sets (rather than determined by information stored by the ontology that defines how the data content is stored). The method then proceeds to block 940 where a user selection of a first value from the list of the values is received by the data analysis system 101. This user selection can be received from an input device 614, or from another input means. The method 900 then proceeds to block 945 where if display information related to a subset of data objects of the first set of data objects on one or more visualizations on a display, the subset of data objects being a portion of the first set of data objects that are linked to data objects in the second set of data objects that have a first property value of the first value. The information can be displayed on, for example, display 612 illustrated in FIG. 1A and FIG. 6.

Implementing one or more aspects of the data analysis system 101 as a virtual computing environment may advantageously enable executing different aspects or modules of the system on different computing devices or processors, which may increase the scalability of the system. Implementing one or more aspects of the data analysis system as a virtual computing environment may further advantageously enable sandboxing various aspects, data, or modules of the system from one another, which may increase security of the system by preventing, e.g., malicious intrusion into the system from spreading. Implementing one or more aspects of the data analysis system 101 as a virtual computing environment may further advantageously enable parallel execution of various aspects or modules of the system, which may increase the scalability of the system. Implementing one or more aspects of the data analysis system 101 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user. Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification. The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
one or more non-transitory computer storage mediums configured to store at least:
a plurality of sets of data objects including at least a first set of data objects of a first object type and a second set of data objects of a second object type; and
computer-executable instructions; and
one or more hardware processors in communication with the one or more non-transitory computer storage mediums, the one or more hardware processors configured to execute the computer-executable instructions to at least:
receive a user selection of the first object type;
generate and display a list of object types linked to the first object type;
receive a user selection of a second object type from the displayed object types;
generate and display a list of properties of the second object type;
receive a user selection of a first property from the list of properties;
display a list of the values associated with the first property;
receive a user selection of a first value from the list of the values;
determine a subset of data objects, of the first set of data objects of the first object type, that are linked to data objects, in the second set of data objects of the second object type, that have a first property value of the selected first value;
generate and display, on a display, one or more visualizations of the subset of data objects of the first set of data objects of the first object type; and
generate and display a tracker bar depicting a sequence of filter operations applied, wherein the sequence of filter operations includes at least: the user selection of the first object type, the user selection of the second object type, and the user selection of the first property.

2. The system of claim 1, wherein the one or more hardware processors are further configured to execute the computer-executable instructions to:
receive a user input of filter information associated with the first set of data objects; and
filter the first data set of data objects using the received filter information and display filtered results on one or more visualizations on a display.

3. The system of claim 2, wherein the one or more hardware processors are further configured to execute the computer-executable instructions to generate and display a search bar configured for receiving the filter information.

4. The system of claim 1, wherein the one or more hardware processors are further configured to execute the computer-executable instructions to:
receive a user selection of a filtering operation displayed in the tracker bar, and
generate and display a visualization depicting the filter operations applied to the first set of data objects up to and including the user selected filtering operation.

5. The system of claim 1, wherein the one or more hardware processors are further configured to execute the computer-executable instructions to display groups of object types in the plurality of sets of data objects.

6. The system of claim 5, wherein the groups of object types are displayed in groups of related categories.

7. The system of claim 1, wherein the one or more hardware processors are further configured to execute the computer-executable instructions to display object types in the plurality of sets of data objects.

8. The system of claim 1, wherein the one or more hardware processors are further configured to execute the computer-executable instructions to save operations performed on the first set of data objects and the resulting visualizations, the saved operations and visualizations being restorable for use in a subsequently performed data analysis workflow.

9. The system of claim 1, wherein the one or more visualizations include one or more of a listogram, a timeline, a numeric distribution, a choropleth map, or a clustering map.

10. A method for performing filtering operations on a set of data objects, the method comprising:
receiving a user selection of a first object type to perform filtering operations on a first set of data objects of a plurality of sets of data objects, the plurality of sets of data objects including at least the first set of data objects of a first object type and a second set of data objects of a second object type;
generating and display a list of object types linked to the first object type;
receiving a user selection of a second object type from the displayed object types;
generating and displaying a list of properties of the second object type;
receiving a user selection of a first property from the list of properties;
generating and displaying a list of the values associated with the first property;
receiving a user selection of a first value from the list of the values;
determining a subset of data objects, of the first set of data objects of the first object type, that are linked to data objects, in the second set of data objects of the second object type, that have a first property value of the selected first value;
generating and displaying, on a display, one or more visualizations of the subset of data objects of the first set of data objects of the first object type; and
generating and displaying a tracker bar depicting a sequence of filter operations applied, wherein the sequence of filter operations includes at least: the user selection of the first object type, the user selection of the second object type, and the user selection of the first property,
wherein the method is performed by one or more hardware processors configured to execute computer-executable instructions on one or more non-transitory computer storage mediums.

11. The method of claim 10, further comprising:
storing, on the one or more non-transitory computer storage mediums, the plurality of sets of data objects; and storing, on the one or more non-transitory computer storage mediums, the computer-executable instructions.

12. The method of claim 10, further comprising:
receiving a user input of filter information associated with the first set of data objects;
filtering the first data set of data objects using the received filter information; and
displaying filtered results on one or more visualizations on a display.

13. The method of claim 12, further comprising generating and displaying a search bar for receiving the user input of filter information.

14. The method of claim 10, further comprising:
receiving a user selection of a filtering operation displayed in the tracker bar, and
generating and displaying a visualization depicting the filter operations applied to the first set of data objects up to and including the selected filtering operation.

15. The method of claim 10, further comprising displaying groups of object types in the plurality of sets of data objects.

16. The method of claim 10, further comprising displaying groups of object types in groups of related categories.

17. The method of claim 10, further comprising saving operations performed on the first set of data objects and resulting visualizations such that the saved operations and visualizations are restorable for use in a subsequently performed data analysis workflow.

18. The method of claim 17, wherein the visualizations include one or more of a listogram, a timeline, a numeric distribution, a choropleth map, or a clustering map.

19. One or more non-transitory, computer-readable storage medium storing computer-executable instructions, which if performed by one or more processors, cause the one or more processors to at least:
receive a user selection of a first object type to perform filtering operations on a first set of data objects of a plurality of sets of data objects, the plurality of sets of data objects including at least the first set of data objects of the first object type and a second set of data objects of a second object type;
generate and display a list of object types linked to the first object type;
receive a user selection of a second object type from the displayed object types;
generate and display a list of properties of the second object type;
receive a user selection of a first property from the list of properties;
display a list of the values associated with the first property;
receive a user selection of a first value from the list of the values;
determine a subset of data objects, of the first set of data objects of the first object type, that are linked to data objects, in the second set of data objects of the second object type, that have a first property value of the selected first value;
generate and display, on a display, one or more visualizations of the subset of data objects of the first set of data objects of the first object type; and
generate and display a tracker bar depicting a sequence of filter operations applied, wherein the sequence of filter operations includes at least: the user selection of the first object type, the user selection of the second object type, and the user selection of the first property.

20. The one or more non-transitory, computer-readable storage medium of claim 19, wherein the computer-executable instructions further cause the one or more processors to at least:
receive a user selection of a filtering operation displayed in the tracker bar; and
generate and display a visualization depicting the filter operations applied to the first set of data objects up to and including the selected filtering operation.

* * * * *